UNITED STATES PATENT OFFICE.

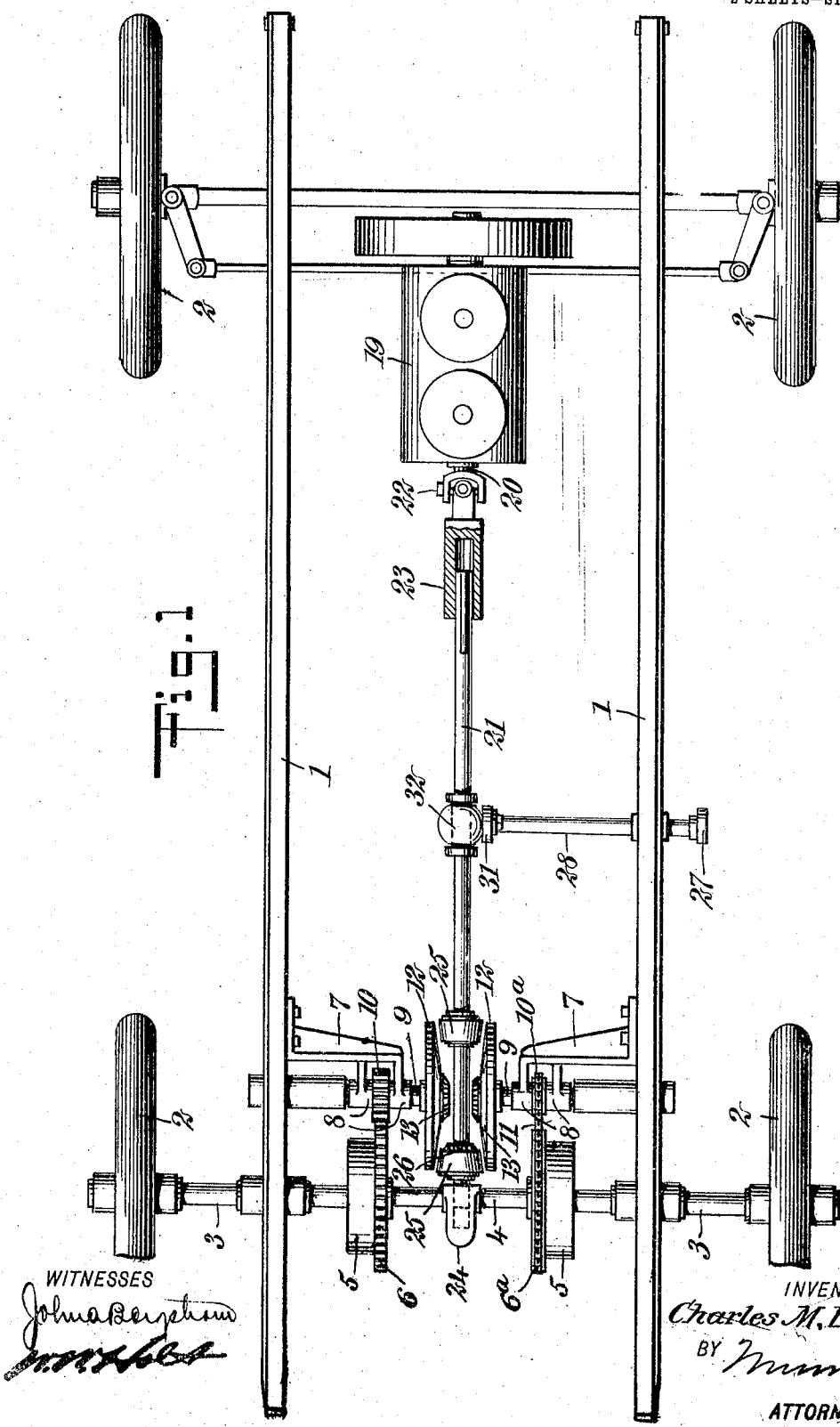

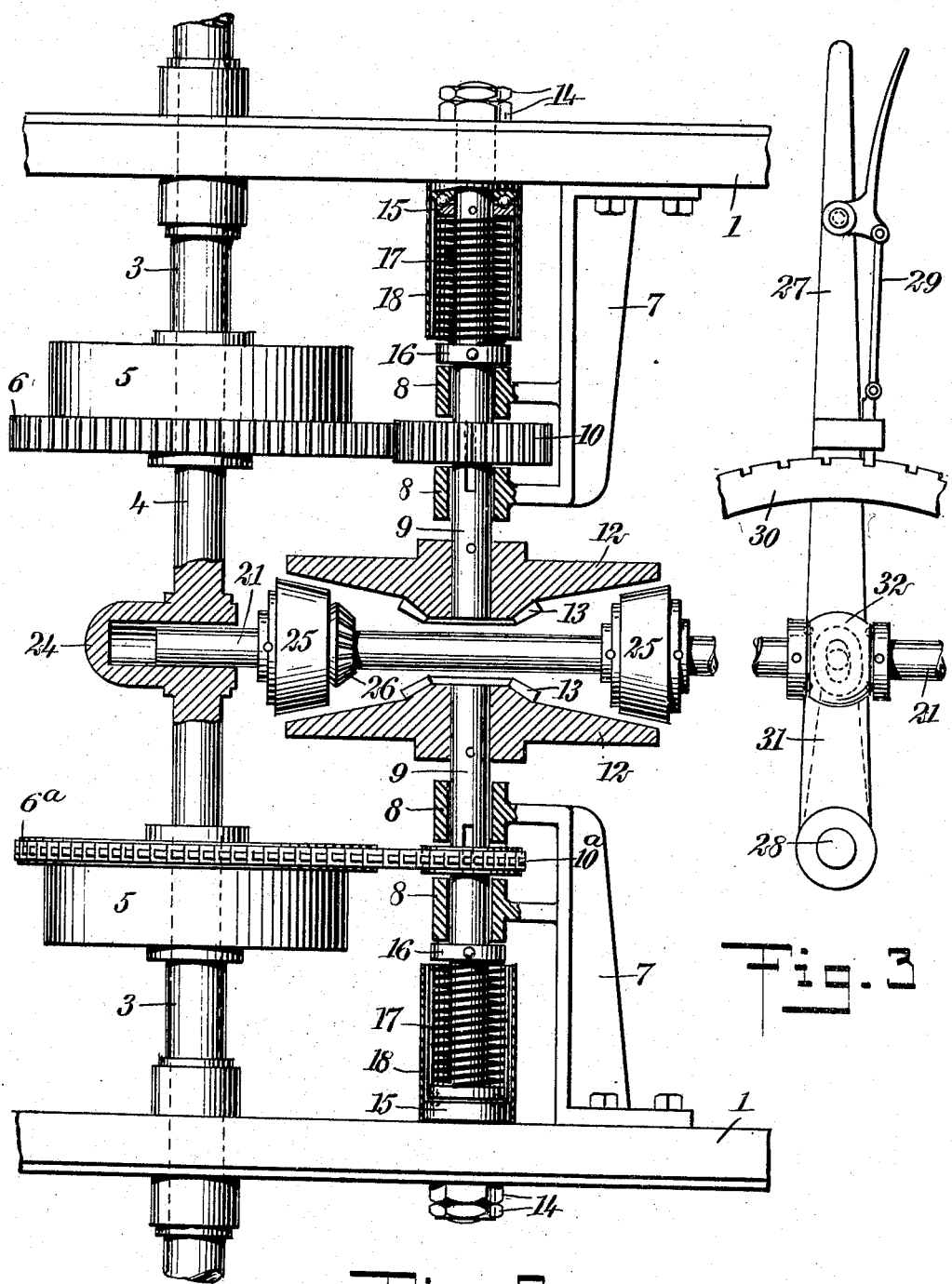

CHARLES M. LEECH, OF LIMA, OHIO.

TRANSMISSION MECHANISM FOR MOTOR-VEHICLES.

No. 901,180.   Specification of Letters Patent.   Patented Oct. 13, 1908.

Application filed February 5, 1907. Serial No. 355,829.

*To all whom it may concern:*

Be it known that I, CHARLES M. LEECH, a citizen of the United States, and a resident of Lima, in the county of Allen and State of Ohio, have invented a new and Improved Transmission Mechanism for Motor-Vehicles, of which the following is a full, clear, and exact description.

This invention is directed to an improved transmission gearing for motor vehicles, and is of such construction that its operation will have no tendency to throw the driving shaft out of alinement and wherein the movement of the vehicle both forward and rearward can be readily controlled and gradually varied, the transmission passing from a friction to a positive drive on respectively shifting the gearing from slow to full speed, the reverse taking place on shifting the gearing in the opposite direction.

Reference is to be had to the accompanying drawings forming a part of this specification, in which similar characters of reference indicate corresponding parts in all the figures.

Figure 1 is a plan of the chassis of a motor vehicle, with one embodiment of my improved transmission gearing applied thereto; Fig. 2 is a fragmentary, sectional view of the same on an enlarged scale, and Fig. 3 is a side elevation of the controlling lever and its connection with the drive shaft.

Referring to the drawing, 1 indicates the frames of a motor vehicle supported on wheels 2, the rear wheels being fixed to the outer ends of sleeves or boxes 3 journaled on the rear axle 4. Also fixed to said sleeves are brake-drums 5 and an adjacent gear 6 and sprocket wheel 6ª, respectively, both constructions being shown in Figs. 1 and 2. At the inside of the frames 1 are rigidly fixed brackets 7, each carrying a pair of spaced bearings 8, in which are journaled sliding shafts 9, said shafts having slidably secured thereto a pinion 10 and a sprocket wheel 10ª, respectively, the latter being connected with the sprocket-wheel 6ª, by a chain 11, and the pinion directly intermeshing with the gear 6, these alternative constructions for gearing the shafts 9 to the wheels being shown in order that it may be readily understood that one or both forms of connection may be employed if desired.

At the opposite ends of the shafts 9 are fixed bevel friction wheels 12, each carrying a centrally-disposed bevel pinion 13. The opposite ends of said shaft are preferably provided with lock nuts 14 at the outside of the vehicle frame and at the inside thereof with ball bearing thrust collars 15 and fixed collars 16, spiral springs 17 surrounding the shaft and interposed between the thrust and fixed collar of each, respectively. The springs and ball bearing collars are preferably inclosed and protected by tubular casings 18.

19 indicates a motor having a drive shaft 20 which is slidably connected with a driving shaft 21 through the intermediary of a universal joint 22, one member of which is provided with a socket 23, in which the shaft 21 is slidably splined. The opposite end of the shaft 21 is journaled in a suitable bearing, preferably in the nature of a socket 24, formed as a part or otherwise affixed to the axle 4. Fixed to the driving shaft 21 between the friction wheels 12, are opposed bevel friction wheels 25, designed to contact with the wheels 12 in driving the vehicle in either direction. The friction wheel 25 which is intended to drive the vehicle forward, carries a bevel pinion 26 on its inner face, the latter being adapted to be intermeshed with the pinions 13 after the vehicle has attained considerable speed through the frictional contact of the wheels 12 and 25. It is thus apparent from this construction, on reciprocating the shaft 21, the forward and rearward movement of the vehicle can be readily controlled and the speed thereof gradually varied. On driving the machine forward, the initial movement is frictional by reason of the contact of the wheels 12 with the wheel 25, which is converted into a positive drive when the machine is moving at full speed, the pinions 13 and 26 being at this time intermeshed.

For reciprocating the shaft 21 and thereby controlling the movement of the vehicle, is provided a controlling lever 27 arranged at one side of the frame 1 and fixed to a shaft 28. The lever, in its preferred form, is constructed with the usual locking mechanism 29 engaging with a notched quadrant 30. The inner end of the shaft 28 carries a fixed arm 31 pivotally connected to a ball bearing thrust collar 32, as best shown in Fig. 3.

Although I have shown and described the preferred construction and arrangement of my improved transmission gear as applied to a motor vehicle, it is obvious that the same may be materially modified within the scope of the appended claims; and I consider that I am entitled to such changes as fall within the limits thereof.

Having thus described my invention I claim as new and desire to secure by Letters Patent:

1. The combination of a driving shaft, shafts having opposed bevel wheels at the opposite sides of the driving shaft, means providing for a lateral, yielding movement of said shafts, opposed bevel wheels fixed to the driving shaft between said first-named wheels, and means for reciprocating the driving shaft.

2. The combination of a driving shaft, shafts having opposed bevel friction wheels at the opposite sides of the driving shaft, means providing for the lateral, yielding separation of said friction wheels and shafts, opposed bevel friction wheels fixed to the driving shaft between said first-named friction wheels, and means for reciprocating the driving shaft.

3. The combination of a driving shaft, shafts having opposed bevel friction wheels provided with opposed bevel pinions centrally arranged, opposed bevel friction wheels fixed to the driving shaft between said first-named friction wheels, and a bevel pinion fixed to the driving shaft adapted to intermesh with said first-named pinions.

4. The combination of a driving shaft, shafts having opposed bevel friction wheels provided with opposed bevel pinions centrally arranged, means providing for the lateral, yielding separation of said friction wheels and pinions, opposed bevel friction wheels fixed to the driving shaft between said first-named friction wheels, and a bevel pinion fixed to the driving shaft adapted to intermesh with said first-named pinions.

5. A transmission gearing including a slidingly mounted driving shaft, a laterally yielding driven shaft arranged at an angle to the driving shaft, and means controlled by the sliding movement of the driving shaft to successively frictionally and positively drive said driven shaft from the driving shaft.

In testimony whereof I have signed my name to this specification in the presence of two subscribing witnesses.

CHARLES M. LEECH.

Witnesses:
STEPHEN KALIHER,
JOHN A. MOHR.